C. S. ASHLEY.
PISTON RING.
APPLICATION FILED APR. 10, 1920.
1,370,940.
Patented Mar. 8, 1921.
2 SHEETS—SHEET 1.
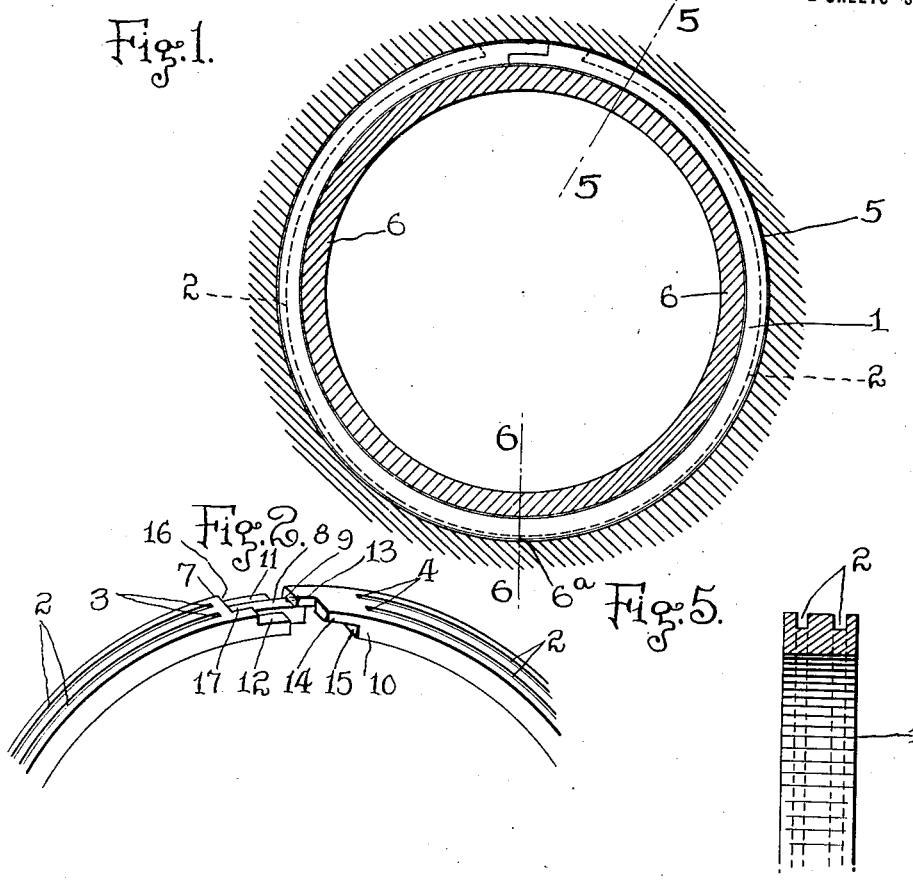
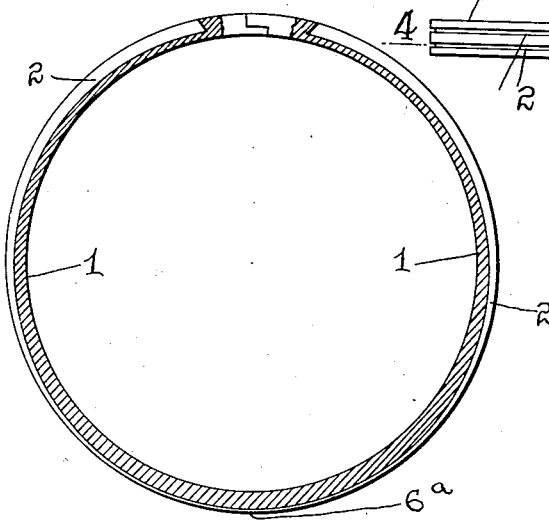
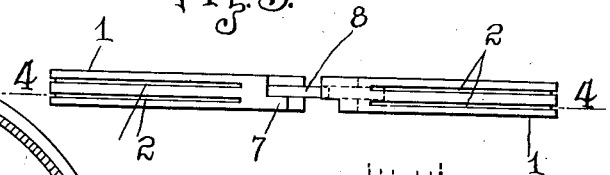
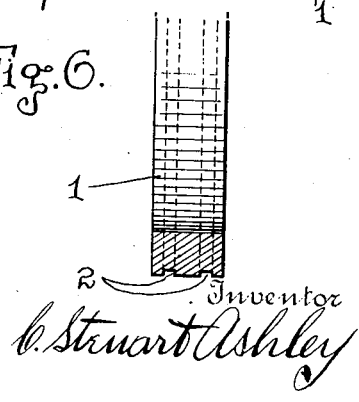
Inventor
C. Stuart Ashley C. S. ASHLEY.
PISTON RING.
APPLICATION FILED APR. 10, 1920.
1,370,940.
Patented Mar. 8, 1921.
2 SHEETS—SHEET 2.
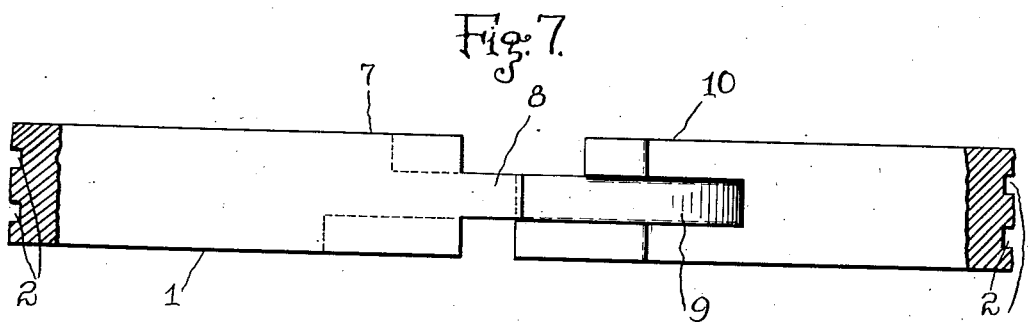
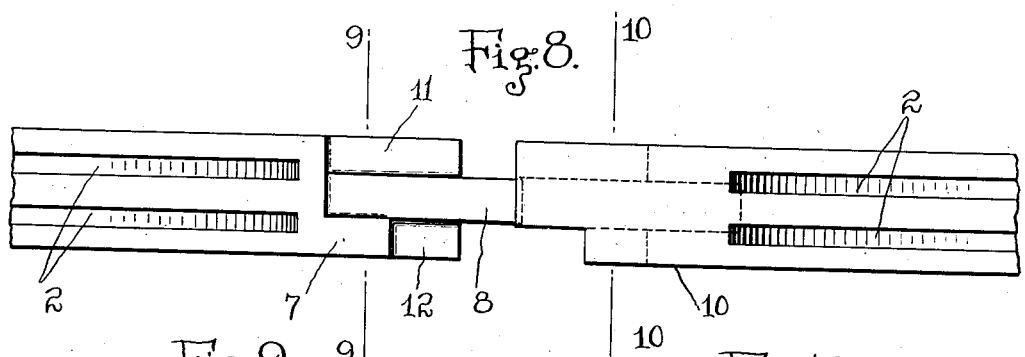
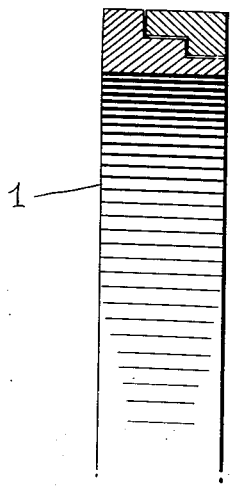
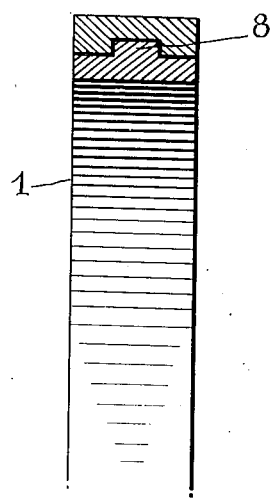
Inventor
C Stuart Ashley

UNITED STATES PATENT OFFICE.

CLARENCE STEUART ASHLEY, OF NEW YORK, N. Y., ASSIGNOR TO LEWIS H. PHELPS, OF NEW YORK, N. Y.

PISTON-RING.

1,370,940.

Specification of Letters Patent.

Patented Mar. 8, 1921.

Application filed April 10, 1920. Serial No. 372,756.

*To all whom it may concern:*

Be it known that I, CLARENCE STEUART ASHLEY, a citizen of the United States, and a resident of New York city, in the county of New York and State of New York, have invented certain new and useful Improvements in Piston-Rings, of which the following is a specification.

This invention relates to piston rings and my improvements are directed particularly to novel means for according to piston rings uniform radial tension throughout the entire circumference thereof while at the same time providing lubricant lodging means in the outer periphery of a piston ring to maintain a fluid supply which is both dischargeable and renewable between the ring and cylinder wall.

Also, a further feature of invention included in this application resides in the novel form of lock joint herein disclosed.

Briefly stated my improved uniform tensioning means comprises the provision of an annular groove formed in the outer peripheral surface of the ring, said groove extending from a point near one end of a divided ring to a corresponding point near its other end, the depth of said groove being equal and greatest at its ends, and thence becoming progressively more shallow to the heel of the ring, where said groove has its least depth. One purpose served by this groove is for the lodgement of lubricant therein wherewith to lubricate the contacting surfaces of both the ring and cylinder wall, wherefore the groove is continuous from one ring end around to the other ring end; and the other purpose of said groove, in the variable depth thereof, is that it may impart into the ring that even or uniform outward tension which it otherwise lacks. This lack of uniformity in the outward tension of a piston ring which normally is of the same cross sectional area throughout is due to the fact of its division to permit its compression and expansion, since thereby the heel or that ring portion opposite the joint is the most freely yieldable, while progressively from said heel portion toward the opposite ring ends the intervening ring portions are relatively more stiff and unyielding. Therefore the grove provided in the outer peripheral surface of the ring being progressively of increasing depth from the heel to points near the opposite ends, has the effect of diminishing the tension of the stiffer portions to the degree of tension possessed by the heel portion, and thus the ring, when contracted to service state is enabled to exert the same degree of radial tension throughout its circumference.

While for the equal tensioning purpose it would not be necessary to extend the groove over the heel portion of the ring, this expedient is resorted to because thereby a continuous chamber or recess is provided for the collection thereof of a constant supply of lubricant at all points about the ring circumference intermediate its end portions.

The other essential feature of my invention, that relating to the lock joint, comprises the formation of a tongue which projects circumferentially from one end portion of the ring, to take into a recess therefor provided in the other end portion thereof. Also the opposite end portions of the ring have interlocking walls or ridges which co-act in the compressed state of the ring to prevent leakage of gas or oil past the joint.

Other features and advantages of my invention will hereinafter appear.

In the drawings:—

Figure 1 is a horizontal section of a cylinder and piston therein having one of my improved rings.

Fig. 2 is a perspective elevation of the joint portion of my improved piston ring.

Fig. 3 is a side view of the ring looking toward the outer face of its joint portion.

Fig. 4 is a horizontal sectional view of the ring, taken on the line 4—4 of Fig. 3.

Fig. 5 is an enlarged sectional view on the line 5—5 of Fig. 1.

Fig. 6 is a similar view on the line 6—6 of Fig. 1.

Fig. 7 is a much enlarged inner detail view of the joint portion.

Fig. 8 is a similar outer detail view.

Fig. 9 is a section on the line 9—9 of Fig. 8, and

Fig. 10 is a section on the line 10—10 of Fig. 8.

In carrying out my invention I produce an oversize, divided ring as 1, which is provided with means in its outer peripheral surface for the collection of lubricating oil. In the example illustrated this means is represented by channels or ducts 2, although the number of said ducts is merely symbolic and may be varied.

Essentially, however said collecting means extend clear around the ring to the points 3, 4, which are located near, but do not extend through, the respective ends of the divided ring. The object desired in terminating the collecting means as at the points 3, 4, is that thereby oil may not pass from said means into the ring joint.

By this collecting means lubricating oil received thereby is in a measure localized to its particular purpose of lubricating the contacting surfaces of the ring and cylinder 5 in the reciprocatory operation of the piston 6.

Also the collecting means, in the form of channels 2 serve the very important function of equalizing the radial tension of the ring throughout its circumference, to which end I consider it desirable to employ the two channels shown, or other plural number thereof. Said channels 2 are of graduated depth, whereof the maximum depth is at the terminal points 3, 4 and decreases therefrom in opposite directions around to the heel of the ring 6ª, where said channels are the most shallow.

This is for the reason that a divided ring, of equal cross-sectional area throughout has its minimum tension at its heel and increases progressively in stiffness to the terminal ends, so that, for tension, equalizing purposes, the removal of material from the ring structure should be in inverse order in degree with relation to its stiffer or more unyielding portions. The ring with its peripheral reduction in material accurately gaged will be found under contraction in a cylinder to exert equal radial tension throughout its circumference.

Another important feature of invention comprised in this application resides in the novel form of leak proof, lock joint, wherein one ring end, as 7, is provided with a circumferentially projecting tongue 8 that is adapted to slidably engage a circumferential recess 9 therefor in the other ring end 10. Recesses 11 and 12, at opposite sides of the tongue respectively, each lie below the top of said tongue; said recess 11 serving, on closure of the ring, to receive the projection 13 from portion 10 that has the tongue receiving recess 9. Also recess 11 is longer than recess 12 to thereby produce a staggered joint effect; while the recess 12 is adapted for the reception of a shouldered portion 14 that is provided at its lower surface with a recess 15, whose end abuts in service against the said end of recessed portion 12.

The effect of this joint structure is to provide means whereby the ring ends are always in engagement through tongue 8 and recess 9, whether the ring is to be closed or expanded, and whereby in use no gap is presented for the passage of gas or oil, whether the ring be closed, or, as may happen with wear, partly expanded; because, when projection 13 separates from its opposed terminal wall 16, it still, with the tongue 8 and jog or step joint 17 prevents the creation of a transverse passage until opened out sufficiently for portion 13 to leave jog 17. And always, in the operation of the joint, the ring end portions are in guided alinement.

Variations may be resorted to within the spirit and scope of my invention, and parts thereof used without others.

I claim:

1. In a device of the character stated, a piston ring having its juxtaposed end portions cut away to form a step joint in the plane of the ring and an outer step joint transversely of the ring, the circumferential meeting surfaces of said first joint being provided respectively with a tongue lying below the ring surface, and a groove to receive the same.

2. In a device of the character stated, a piston ring having one of its juxtaposed ends provided with a circumferentially projecting tongue lying below the outer surface of the ring and between its edges, on each side of which are outer shouldered portions of varying area, the other end of said ring having a circumferential inner groove in alinement with said tongue and adapted to receive the latter, and said groove having on opposite sides thereof inner recesses of varying area in alinement with said shouldered portions.

3. In a device of the character stated, a piston ring having one of its juxtaposed ends provided with a circumferential tongue lying below the outer surface of the ring and between its edges, outer shouldered portions of varying area on each side of said tongue and of lesser length than said tongue, the other end of said ring having a circumferential inner groove in alinement with said tongue and adapted to receive the latter and said groove having on opposite sides thereof inner recesses of varying area in alinement with said shouldered portions.

4. In a device of the character stated, a piston ring having one of its juxtaposed ends provided with a circumferentially projecting tongue of less thickness than the ring body, shouldered portions of varying area on each side of said tongue, and a circumferential inner groove in alinement with said tongue, and adapted to receive the latter, said groove having on opposite sides thereof inner recesses of varying area in alinement and coacting with said shouldered portions, whereby the contiguous areas, when the ring is compressed, form a stepped joint on a transverse section adjacent the base of said tongue.

Signed at New York city, in the county of New York and State of New York, this 2nd day of April, 1920.

C. STEUART ASHLEY.